United States Patent [19]
Kratz et al.

[11] 3,940,789
[45] Feb. 24, 1976

[54] MULTICOLOR DISPLAY FOR THE VISUAL-AESTHETIC PORTRAYAL OF ELECTRIC SIGNALS

[75] Inventors: John E. Kratz; Bruce W. Williams, both of Richmond, Va.

[73] Assignee: Kew, Incorporated, Richmond, Va.

[22] Filed: July 13, 1973

[21] Appl. No.: 378,964

[52] U.S. Cl. ................................ 358/82; 179/1 SP
[51] Int. Cl.² .......................................... H04N 9/02
[58] Field of Search ...... 178/5.4 R; 179/1 VS, 1 SP; 343/5 CD; 315/23; 358/82; 84/464

[56] References Cited
UNITED STATES PATENTS

| | | | |
|---|---|---|---|
| 3,193,838 | 7/1965 | Mitchell, Jr. | 346/110 |
| 3,604,852 | 9/1971 | Weintraub | 179/1 VS |
| 3,627,912 | 12/1971 | Hearn | 178/5.4 R |
| 3,697,688 | 10/1972 | Busch et al. | 178/5.4 R |
| 3,723,652 | 3/1973 | Alles et al. | 179/1 VS |
| 3,806,648 | 4/1974 | Odagi | 179/1 SP |

OTHER PUBLICATIONS

RCA Service Co., Inc., *Practical Color Television*, 1953, pp. 41–42.

"Electronics World," Dec. 1965 (Vol. 74, No. 6), cover page and p. 3.

*Primary Examiner*—Robert L. Griffin
*Assistant Examiner*—Mitchell Saffian
*Attorney, Agent, or Firm*—Lowe, King & Price

[57] ABSTRACT

A multicolor visual display apparatus for stereophonic sound signals is disclosed. The display apparatus includes a conventional three gun color cathode ray tube, having a screen with a plurality of colored phosphor dot triads. Stereophonic signals are coupled to a deflection yoke located on the neck of the tube for producing a pattern on the screen in sympathy with the information content of the channels. The convergence coils and purity rings normally located at the rear of the yoke on a three gun color tube neck are not used. Their absence permits the location of the deflection yoke behind its normal position whereby electrons from any of the guns strike phosphor dots of different colors in different regions of the screen, producing a pleasing multicoloration of the pattern. A coil in the nature of a standard degaussing coil is activated while the pattern is displayed to further enhance this multicoloration.

20 Claims, 4 Drawing Figures

MULTICOLOR DISPLAY FOR THE VISUAL-AESTHETIC PORTRAYAL OF ELECTRIC SIGNALS

FIELD OF THE INVENTION

The invention relates generally to an apparatus for the visual portrayal of electrical signals and, more particularly, to a multicolored aesthetic display for electrical signals.

BACKGROUND OF THE INVENTION

In the prior art, cathode ray tube oscilloscopes have been used for the display of patterns produced by deflecting an electron beam of the tube along a horizontal axis in proportion to a first signal and simultaneously deflecting the electron beam along a vertical axis in proportion to a second signal. When the first and second signals are harmonically related, the resultant patterns are stationary and information may be derived from the pattern shape. In particular, when the signals are harmonically related sinusoids, the resultant patterns are termed Lissajous patterns. When the signals are not harmonically related the patterns change in time, often going through pleasing permutations. Stereophonic signals have been displayed in this manner for both the purposes of obtaining information from the displayed patterns and for the aesthetic appearance of the patterns permutations.

Recently, color cathode ray tubes have been proposed as displays for the patterns produced by stereophonic signals wherein the patterns might be colored in sympathy with these signals to enhance the aesthetic appearance of the displayed patterns. In U.S. Pat. No. 3,627,912 to Hearn, issued Dec. 19, 1971, it was proposed that the color of a pattern produced by stereophonic signals be modulated in accordance with the instantaneous velocity of the electron beam. A relatively large number of circuit elements are required to achieve that technique of color modulation which requires the instantaneous variation of the proportions of current emitted from the three guns of a color picture tube.

To provide a commercially acceptable multicolor aesthetic cathode ray tube display apparatus for electrical signals, a small number of inexpensive parts must be used in order to minimize the cost of such a display.

SUMMARY OF THE INVENTION

Multicolor display apparatus for electrical signals is provided wherein the horizontal and vertical coils of a deflection yoke for a three gun color cathode ray tube are fed by sound related electrical signals to produce a pattern on the tube screen in sympathy with the sound signals. It was unexpectedly observed that when the usual convergence coils and purity rings on the neck of the three gun color tube are removed and the deflection yoke is located substantially at the rear of the tube neck, at a position approximately where the convergence coils are usually located, that a multicolored pattern is produced in response to separate signals being supplied to the orthogonal coils of the yoke. This positioning of the yoke provides a means for modulating the instantaneous color of the displayed pattern in correspondence with the instantaneous amplitude of the electrical signals feeding the yoke. It was further unexpectedly observed that when a coil, in the nature of a standard degaussing coil wrapped around the tube just behind the screen is supplied with current the multicoloration of the displayed pattern is further increased. No color modulating circuitry of the type which instantaneously varies the proportions of the beam intensities of the three guns is required. As the electron beam emitted from any one gun traces the displayed pattern, the colors along the pattern vary over many hues and tints in accordance with the instantaneous location of the beam on the tube screen. In fact, locations on the tube screen exist in correspondence with substantially all the hues and the tints which the color tube can normally produce.

Means are provided for individually biasing or setting, on a semipermanent basis, (as opposed to instantaneously varying) the beam intensities of the three guns whereby each beam may be individually turned on or off. With the intensities of the three beams set substantially equal, three similar patterns, one due to each gun, are produced, each having a different sequence of coloration. The three patterns are spaced apart sufficiently to be separately distinguishable due to the absence of the convergence coils. The provision of these three separately distinguishable patterns lends a further aesthetic enhancement to the display.

Very little electrical circuitry is required to operate the color display due in part to the inherent color modulation produced by the deflection yoke signals and by the coil current. In the electrical circuitry that is required the emphasis is placed on simplification and the use of high volume components. Thus, the anode voltage for the tube is supplied by the provision of a high frequency oscillator operating at a frequency where a "television flyback" autotransformer can be used for voltage step-up. The output of the autotransformer is applied to a voltage tripler circuit for producing the d.c. anode voltage. The capacitors of the tripler are chosen so that the anode voltage has a substantial ripple, which, when the beam intensities are set to a low value, produces a dashed pattern which some find aesthetically pleasing, particularly with rapidly changing sound signals.

To prevent burning of the phosphors of tube due to a stationary electron beam, the display is blanked when the sound related signal is relatively weak. This blanking is achieved by coupling a sound related signal to the gate of a silicon controlled rectifier which is in series with a relay coil. The contacts of the relay are situated within the anode voltage producing circuitry to stop the production of anode voltage in the absence of the sound related signal.

OBJECTS OF THE INVENTION

It is an object of the present invention to provide a new and improved multicolor visual display for electrical signals of substantially reduced cost than heretofore possible.

It is a further object of the present invention to provide means for multicoloring displayed stereophonic signal patterns on a three gun color tube without the necessity of instantaneously varying the proportions of current emitted from the three guns.

The above and still further objects, features and advantages of the present invention will become apparent upon consideration of the following detailed description of specific embodiments thereof, especially when taken in conjunction with the accompanying drawing wherein:

DETAILED DESCRIPTION OF THE INVENTION

Figure 1:
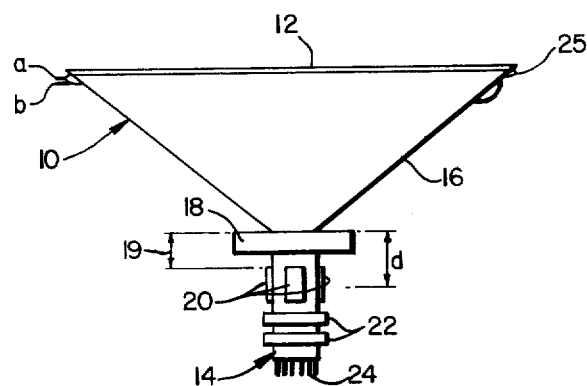
FIG. 1 is a view perpendicular to the axis of a three gun color cathode ray tube with a deflection yoke, positioned thereon as in the prior art.

Referring first to FIG. 1, a conventional three gun color cathode ray tube 10 is shown with a phosphorescent screen 12 at the front of tube 10 on which images or patterns can be displayed. At the back of tube 10 is a small diameter elongated neck 14 which contains three electron beam guns for producing three electron beams impinging on screen 12. Between screen 12 and neck 14 is a sloping transition region 16. Various parts are shown located on neck 14 as in the prior art use of tube 10 in a color television receiver. Deflection yoke 18 provides means for simultaneously deflecting the electron beams impinging on screen 12 in accordance with a raster. Yoke 18 is normally located just abutting sloping transition region 16, although an adjustment range 19 is provided for moving the yoke aft up to approximately one inch. No movement of yoke 18 in excess of adjustment range 19 is possible because of the location of a triad of convergence coils 20 aft of the yoke. Convergence coils 20 provide means for substantially individually deflecting, and thereby aligning, the electron beams from each of the three guns, so that the beams come together at the same location just in front of the screen 12. Located in back of the convergence coils are purity rings 22 for very finely adjusting the purity of the color produced throughout screen 12 by each of the three guns. At the end of neck 14 are socket pins 24 connected to the various electrodes and filaments within tube 10. Coil 25 is the standard degaussing coil which encircles transition region 16 of tube 10, just to the rear of screen 12. This coil is generally energized with a.c. voltage at its terminals a and b only during warm-up of tube 10. When the tube is active no current is normally supplied.

Figure 2:
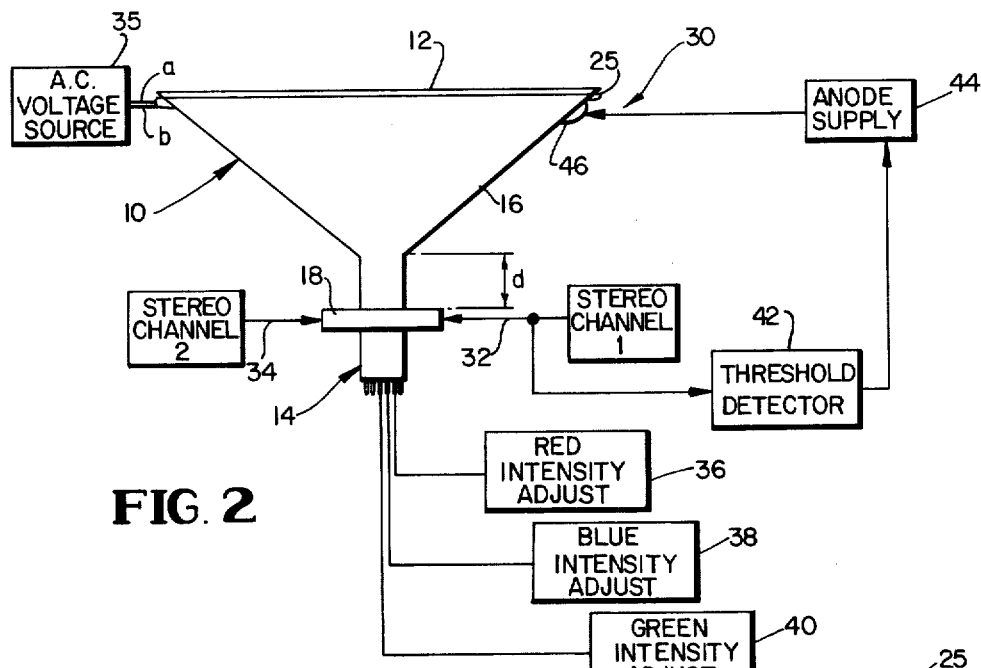
FIG. 2 is a simplified schematic of the multicolor display of the invention including the three gun color cathode ray tube of FIG. 1. The positioning of the deflection yoke in the invention is indicated.

Reference is next made to FIG. 2 wherein the multicolored sound display 30 of the invention is schematically shown. Signal sources 32 and 34 from a pair of non-periodic random information signal channels, such as two stereo sound channels, are fed to the vertical and horizontal coils, respectively, of yoke 18. An aesthetic pattern (as opposed to a raster) is formed on screen 12 by the deflection of any combination of the three electron beams of the three gun tube 10 in accordance with the signal sources 32 and 34. Convergence coils 20 and purity rings 22 are removed. The absence of these parts permits the location of deflection yoke 18 aft on neck 14 a distance $d$ from its normal position. It is this location of the yoke 18 which multicolors the displayed pattern on screen 12. The color of the pattern produced by each individual beam goes through a substantial range of tints and hues along the pattern. If the pattern covers an area substantially traversing the entire screen 12, substantially all the hues and tints which the tube 10 can produce are produced by each individual beam. Yoke 18, located aft of its usual adjustment range 19, is preferably located approximately where the removed convergence coils 20 would have been situated. Distance $d$ is approximately 2 inches although it varies somewhat with different models and sizes of tube 10. Coil 25 is supplied with 60 hertz a.c. voltage from voltage source 35 via coil terminals $a$ and $b$ during the time when the patterns are displayed. A more rapid variation of the color along the pattern traced by each individual electron beam results. Preferably coil 25 is a standard degaussing coil and source 35 supplies the usual current used for degaussing an inactive tube.

Adjustable voltages 36, 38, and 40 are applied to corresponding electrodes of each of the three guns, red, blue and green, respectively. These voltages provide means for individually setting the beam intensities of the three guns. A similarly shaped but distinctly spaced apart pattern is produced by each of the three guns. Each of the patterns has a different sequence of color variations. By individually adjusting the beam intensities from the three guns, any number of the three distinct patterns may be simultaneously displayed. The signal from one of the input channels, e.g., source 32 is applied to a threshold detector 42 which in turn controls the operation of anode high voltage supply 44 connected to the tube's anode 46. When signal is absent from source 32 for a period of time, for example, a one second pause in the sound, the tube 10 must be blanked to prevent a stationary electron beam from burning the screen 12. Threshold detector 42 senses the absence of sound content in the signal line 32 and turns off the anode high voltage supply 44 until the sound content returns or initiates.

Figure 3:
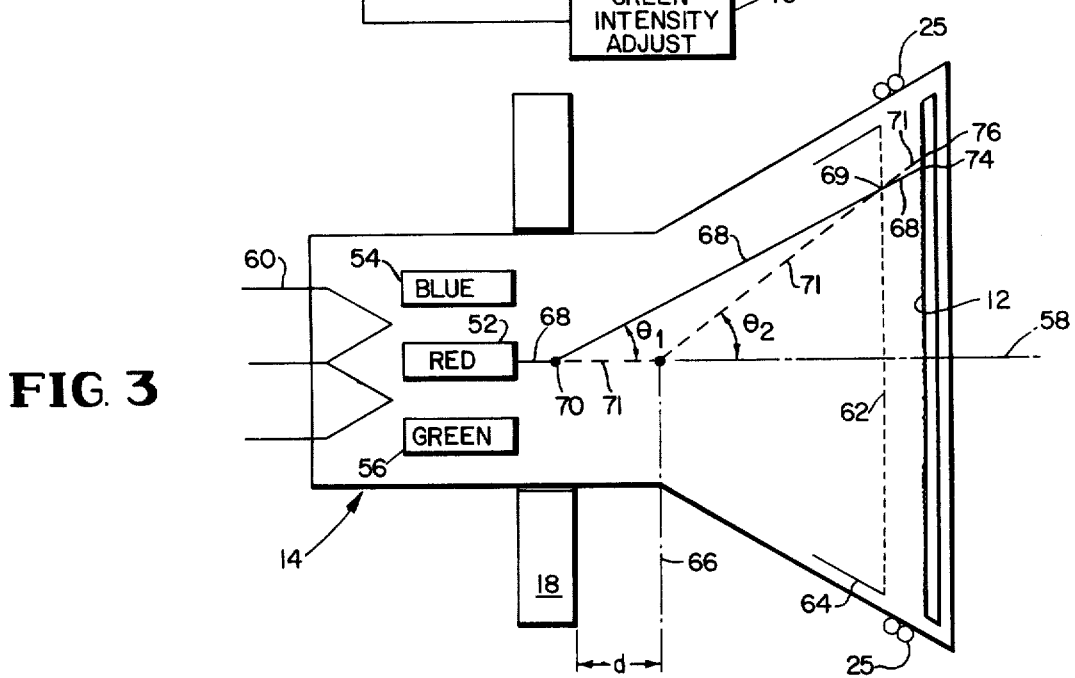
FIG. 3 is a schematic view of the internal structure of the cathode ray tube in conjunction with the deflection yoke positioned as in the invention.

Although the reasons for the multicoloration of the produced patterns are not fully understood, there is a theory which tends to explain th phenomenon. FIG. 3 shows the internal structure of the tube 10. The tube comprises three electron guns 52, 54 and 56, respectively provided to produce electron beams that normally strike phosphors for the primary colors, red, blue and green. These guns, as is well known, are disposed at the corners of an equilateral triangle (not shown) which is traverse to tube longitudinal axis 58. Each gun is composed of cathode, grid and screen electrodes (not shown). Filaments 60 are disposed within the tube neck to provide electron space charge to the guns. To illuminate any discrete location on phosphor screen 12, the beams from the equilateral triangle of guns 52, 54 and 56 normally pass through an aperture 62 of shadow mask 64, just in front of the screen, and impinge on a color corresponding equilateral triangle of phosphor dots on the phosphor screen. The relative intensities of beam energy falling on the red, blue and green phosphor dots determines the apparent color. The aperture 62 is essentially a pinhole lens to produce an inverted electron image of the gun triad on the phosphor screen.

Yoke 18 is an electromagnet which provides a magnetic field (not shown) in proportion to the horizontal and vertical deflection signals of sources 32 and 34 for simultaneously deflecting electron beams from the three electron guns in horizontal and vertical directions in proportion to the signals. With the yoke moved back a distance $d$ from its normal position, the electron beams from the various electron guns are deflected or bent upstream of the position 66, at the base of the neck 14, where deflection would normally occur. Line 68, representing the path or trajectory of the electron beam from red gun 52 is illustrative. Line 68 is directed generally axially as it leaves red gun 52 but is bent at point 70 as the line passes within yoke 18. After point 70, line 68 continues straight through a particular aperture 69 in the shadow mask 64 and thereafter impinges on phosphor screen 12 at location 74. The line 68 makes an angle of $\theta_1$ with respect to the tube longitudinal axis 58. If the deflection yoke were located at its normal position 66, then dashed line 71 would represent the path of the electron beam from red gun 52. Line 71 is directed generally axially until normal yoke location 66 where the line is bent, and thereafter continues straight through the particular aperture 69. Though passing through the same aperture as line 68, line 71 hits the screen 12 at a different location 76. The reason for this is apparent, since to pass through the same aperture as line 68, line 71 must make an angle $\theta_2$ with tube axis 58 which is larger than $\theta_1$. Thus, the location of yoke 18 rearward a distance $d$ changes the angle of arrival of the electron beams at any shadow mask aperture 62 which in turn causes the beams to strike other than their usually intended corresponding phosphor dots; this causes multicoloration. As the beams are deflected to strike locations on the screen 12 which are more and more removed from tube axis 58, the difference in angle between $\theta_1$ and $\theta_2$ increases. Thus, the degree of multicoloration produced by the electron beam from any of the guns increases with increased deflection. Since the deflection is in proportion to the stereo channel signals on lines 32 and 34 of FIG. 2, it is apparent that the multicoloration of the pattern is dependent on the amplitudes of these signals.

With only the yoke 18 moved back a distance $d$, the pattern traced by any individual electron beam is not multicolored as it passes close to the center axis 58 of screen 12 and guns 52, 54 and 56. To produce multicoloration of the pattern when the beam is close to the central axis 58, the coil 25 is excited with a.c. voltage from source 35. An axial a.c. magnetic field is produced by coil 25 which causes the electron beams from the three guns to slightly spiral or corkscrew about axis 58. This spiralling, even in the absence of deflection yoke magnetic field, changes in time the angle at which the electron beams pass through any aperture 62 of shadow mask 64, consequently causing the beams to strike other than their usually intended corresponding color phosphor dots.

Figure 4:
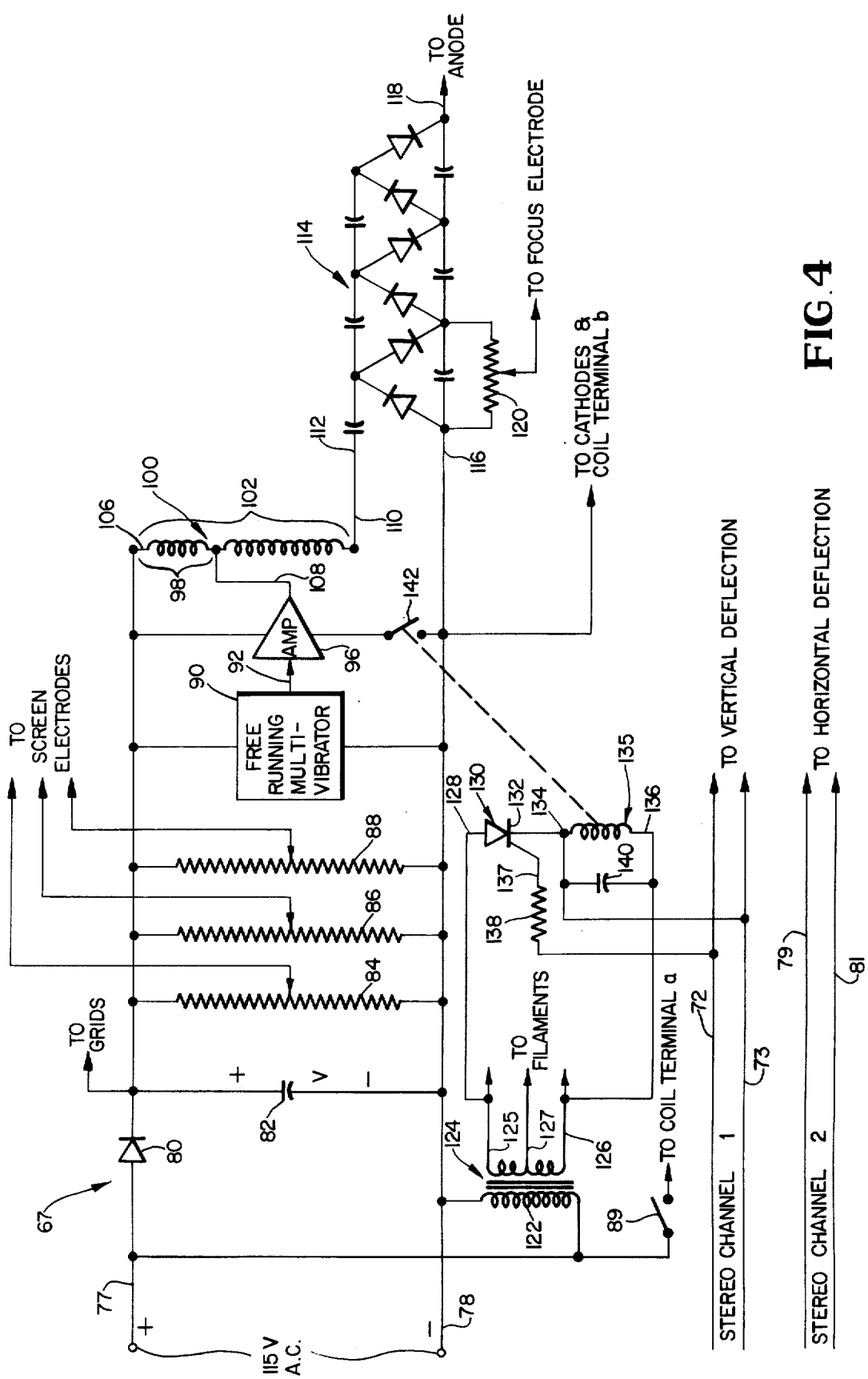
FIG. 4 is a schematic of the electrical circuitry used in conjunction with the three gun color tube.

FIG. 4 is a schematic representation of the electrical circuitry 67 for operating the multicolor sound display. Input lines 72 and 73 for a first stereo channel are applied across the vertical deflection coil of deflection yoke 18 while input lines 79 and 81 for a second stereo channel are applied across the horizontal deflection coil of deflection yoke 18. These input lines are to be fed by external amplifiers. Buffer amplifiers (not shown) may be incorporated in cascade with the input lines to enable the feeding of the input lines with preamplifier signals. Various voltages for operating tube 10 are derived from a 115 volt a.c. house voltage source on lines 77 and 78. A half wave rectifier across source lines 77 and 78 which is composed of a diode 80 in series with a filtering capacitor 82 provides a d.c. voltage V across capacitor 82. This d.c. voltage is applied to the grids of each gun 52, 54 and 56, and is the d.c. supply for electron tubes within the electrical circuitry 67. The a.c. voltage on lines 77, 78 is connected across the coil 25 via a switch 89. The switch 89 provides means for activating coil 25.

Continuously variable resistive voltage dividers 84, 86 and 88 each tap off a different variable fraction of voltage V for application to each of the screen electrodes of the three guns 52, 54, and 56. These variable voltage dividers provide means for individually setting the intensity of the electron beams due to each gun. The range of variation of each voltage divider is such that the intensities of the electron beams of each gun may be set anywhere from substantially black to very bright. Thus, utilizing voltage dividers 84, 86 and 88, any number of the distinct patterns due to each gun may be displayed.

The anode high voltage for the tube 10, on the order of 21 kilovolts, is supplied via an oscillator. Free running multivibrator 90, operated from supply voltage V delivers an output pulse train at its output terminal 92. The output pulse train on line 92 is inputted to an amplifier 96, normally operated from supply V, which amplifies the output pulse train and applies it to a short section of windings 98 of a "television flyback" autotransformer 100. The autotransformer, across its entire length of windings 102, provides a voltage step-up of this pulse train to approximately 7 kilovolts. The output pulse width of the multivibrator is chosen such that oscillation occurs at a nominal 16 kilohertz rate. The autotransformer 100 has one end 106 connected to the positive side of voltage V. Spaced between end 106 and the output terminal 108 of amplifier 96 is the short section of windings 98. The other end 110 of autotransformer 100, which has a voltage in the form of an amplified pulse train, is connected to input line 112 of a voltage tripler circuit 114. The other of the tripler input line 116 is connected to the negative side of voltage V. The output line 118 of voltage tripler 114 provides approximately 21 kilovolts to the anode of tube 10. The capacitors of the tripler are chosen to be of somewhat low capacitance to give the output anode voltage a substantial ripple preferably on the order of 50%. When the screen voltage from variable dividers 84, 86 and 88 are set low, a dashed pattern may be displayed on screen 12, which is bright at the peaks of the voltage ripple and substantially black at the valleys of the voltage ripple. Some feel that dashes enhance the displayed sound pattern's aesthetic appearance when the stereo channel signals are in response to very rapidly changing musical notes.

The tube 10's gun cathodes are supplied from the negative side of supply voltage V. The focus electrode of the tube 10 is supplied from a variable voltage divider 120, tapped from an intermediate voltage of tripler 114. By varying this focus voltage the beam spot size on the screen 12 may be adjusted. Consequently the width of the line tracing the patterns may be adjusted.

The primary winding 122 of a filament transformer 124 is connected across the 115 volt a.c. input lines 77 and 78. Filament transformer 124 has a floating center trapped 12 volt a.c. secondary composed of lines 125, 126 and center tap 127 for supplying filament voltages to tube filaments 60 and to the filaments of the tubes within circuitry 67. Line 125 is connected to the anode 128 of silicon controlled rectifier (SCR) 130. The cathode 132 of SCR 130 is connected to one end 134 of a 6 volt d.c. relay coil 135. The other end 136 of relay coil 134 is connected to the secondary line 126 whereby one half of the secondary (6 volts a.c.), the high current electrodes (the anode and cathode) of the SCR and the relay coil are in series. The control voltage of the SCR is input line 72 of stereo channel 1 which is coupled to the SCR gate 137 via an isolation or current limiting resistor 138. The other input line 73 from channel 1 is coupled to the SCR cathode 134. The SCR conducts current to the relay during each positive half cycle of the a.c. voltage, in which a positive control voltage measured from gate to cathode triggers the SCR. During the negative half cycle of the a.c. voltage no current is conducted by the SCR because the SCR cannot conduct current from cathode to anode. If the SCR is retriggered at substantially the beginning of each positive SCR is cycle then a resultant half wave rectified waveform is filtered to d.c. by a capacitor 140 in parallel with the relay coil. This d.c. voltage, on the order of 6 volts, is sufficiently large to maintain relay coil 135 in an energized state. Should there be no channel 1 signal then the SCR will not be retriggered and the d.c. voltage across the relay coil will decay below a voltage necessary to energize the relay. Upon return of channel 1 signal, retriggering of the SCR is again initiated, returning the relay to the energized state. Thus, when channel 1 signal is present the relay is energized while when channel 1 signal is absent the relay is not energized. The contacts 142 associated with relay coil 135 are closed when the relay is energized and open when the relay is not energized. Contacts 142 are in series with the supply voltage to amplifier 96. When the contacts are open due to the absence of channel 1 signal, the amplifier 96 is inactivated which causes the anode voltage on line 118 to substantially vanish. Thus, the electron beams from the three guns are turned off because of the absence of the anode voltage in order to blank tube 10 when the input electrical signals are not sufficiently strong to spread the energy of the tube's electron beams.

Having described a specific embodiment of the invention, it should be apparent that the objects of the invention have been met and that numerous modifications and equivalents of the embodiment may be made which are within the spirit and scope of the invention. Therefore, it is intended that the invention not be limited except with reference to the following claims.

What is claimed is:

1. An apparatus for displaying colored aesthetic patterns of the information in two random electrical signals comprising:
    a. a source of said random signals;
    b. a color cathode ray tube, having a neck, a screen and a transition between said neck and said screen, said tube having a high voltage electrode and containing three electron beam guns within said neck for producing three electron beams each associated with a different one of three primary colors within the screen is adapted to be struck by said three electron beams, said screen having a plurality of phosphor dots of each of the three primary colors; and
    c. a deflection yoke coupled to said electrical signals for deflecting the electron beams of said guns in response to said two electrical signals, said deflection yoke having a normal position on the neck of said cathode ray tube for allowing each dot to be struck by the electron beam from the gun of its associated color, said deflection yoke being positioned in back of its normal position to such a degree that substantial regions of dots of all three primary colors may be struck by the electron beams from any of the three guns.

2. The apparatus of claim 1 wherein the electrical signals are stereophonic sound signals.

3. The apparatus of claim 2 wherein the normal position of the deflection yoke is abutting said transition and said yoke is positioned at least 2 inches in back of said normal position.

4. The apparatus of claim 1 wherein the deflection yoke is located to the rear of a normal adjustment range on the neck of the tube.

5. The apparatus of claim 1 wherein said deflection yoke is located on the tube neck approximately in a position where convergence coils are normally located.

6. The apparatus of claim 4 in combination with means for applying high voltage to said high voltage electrode including an oscillator, and a blanking means for turning off the electron beams when the electrical signals are relatively weak, said blanking means including means for removing the high voltage from the electrode.

7. The apparatus of claim 6 wherein said blanking means further comprises:
    a. a silicon controlled rectifier having two high current electrodes and a gate electrode, said gate electrode coupled to one of said input lines;
    b. a relay coil in series with said high current electrodes;
    c. an alternating voltage supply in series with said high current electrodes and said relay coil; and
    d. a capacitor in parallel with said relay coil.

8. The apparatus of claim 1 wherein the tube has a central axis perpendicular to the screen and the screen has a center through which the axis passes, each phosphor dot in the center and in proximity to the center of the tube normally being struck by an electron beam from only one of the guns despite the position of the yoke, and further including magnet means for producing an a.c. axial magnetic field of sufficient strength to deflect an electron beam from one of the guns to strike phosphor dots in the center of the screen not normally struck by an electron beam of said one of the guns.

9. The apparatus of claim 8 in combination with means for applying high voltage to said high voltage electrode including an oscillator, and blanking means responsive to at least one of the electrical signals for removing the high voltage from the electrode.

10. The apparatus of claim 9 wherein said blanking means further comprises:
    a. a silicon controlled rectifier having two high current electrodes and a gate electrode, said gate electrode coupled to one of said input lines;
    b. a relay coil in series with said high current electrodes;
    c. an alternating voltage supply in series with said high current electrodes and said relay coil; and
    d. a capacitor in parallel with said relay coil.

11. An apparatus for displaying colored aesthetic patterns of the information in two stereophonic electrical signals comprising:
    a. a source of said signals;
    b. a color cathode ray tube having a neck, a screen, an axis perpendicular to the screen, a transition between said neck and said screen, three electron guns within said neck for producing three electron beams each associated with a different one of three primary colors, wherein the screen has a plurality of phosphor dots of each of the three primary colors and wherein any particular dot is normally adapted to be struck by its color associated electron beam;

c. means connected to the source for deflecting the electron beam from any of the three guns in response to the electrical signals; and d. means for producing an a.c. field within the tube of sufficient strength to bend the electron beams to such a degree that throughout the screen substantial regions of dots of all three primary colors may be struck by the electron beams from any of the three guns while the beam from any of the guns is being deflected in response to the electrical signals.

12. The apparatus of claim 11 whrein said a.c. field producing means includes means for producing an axial a.c. magnetic field.

13. The apparatus of claim 11 wherein said deflection means comprises a yoke which is located on the neck of the tube in back of a normal adjustment range, said deflection yoke being positioned in back of its normal position to such a degree that substantial regions of dots of all three primary colors may be struck by the electron beams from any of the three guns.

14. An apparatus for displaying colored aesthetic patterns in response to first and second sources of random, non-periodic information signals, comprising a source of said signals, a cathode ray tube having a multicolor screen including a multiplicity of phosphor regions dispersed across the entire screen, each of said regions including plural phosphor segments of different colors, said tube further including an electron beam gun for producing a beam of electrons adapted to strike the screen, means responsive to the first and second signals for respectively deflecting the electron beam across the screen in first and second mutually orthogonal directions, and means for controlling trajectories of the electron beam between the gun and the screen so that the electron beam strikes phosphors for all of the colors while the beam is being deflected in response to the signals.

15. An apparatus for displaying colored aesthetic patterns in response to a pair of random, non-periodic signals, comprising a source of said signals, a cathode ray tube having a multicolor phosphor screen including a multiplicity of phosphor regions dispersed across the entire screen, each of said regions including plural phosphor segments of different colors, said tube further including an electron beam gun for producing an electron beam adapted to strike the screen, means responsive to the signals for deflecting the electron beam across the screen, and magnet means for controlling the trajectories of the electron beam between the gun and the screen so that the electron beam strikes phosphors for all colors while the beam is being deflected in response to the signals.

16. The apparatus of claim 15 wherein said magnet means includes means for producing an axial a.c. magnetic field causing the electron beam to spiral about a beam axis between the gun and screen.

17. The apparatus of claim 16 wherein said deflection means comprises a deflection yoke responsive to the signals, said yoke being located on the neck of the tube in back of a normal adjustment range.

18. The apparatus of claim 15 wherein said deflection means comprises a deflection yoke located on the neck of the tube in back of a normal adjustment range.

19. The apparatus of claim 12 wherein the means for producing the axial a.c. magnetic field includes a degaussing coil of the tube.

20. An apparatus for displaying colored aesthetic patterns in response to a pair of random, non-periodic signals, comprising a cathode ray tube having a multicolor phosphor screen including a multiplicity of phosphor regions dispersed across the entire screen, each of said regions including plural phosphor segments of different colors, said tube further including an electron beam gun for producing an electron beam adapted to strike the screen, means responsive to the signals for deflecting the electron beam across the screen, and a degaussing coil of the tube for producing an axial a.c. magnetic field for controlling the trajectories of the electron beam between the gun and the screen so that the electron beam strikes phosphors for all colors while the beam is being deflected in response to the signals by causing the electron beam to spiral about a beam axis between the gun and screen.

* * * * *